US005922157A

United States Patent [19]

Snider

[11] Patent Number: 5,922,157

[45] Date of Patent: Jul. 13, 1999

[54] METHOD FOR CUTTING RIGID TILE

[75] Inventor: Michael J. Snider, Chandler, Ariz.

[73] Assignee: Tileze, Inc., Phoenix, Ariz.

[21] Appl. No.: 08/903,998

[22] Filed: Jul. 31, 1997

[51] Int. Cl.[6] .............................. B32B 31/18; E04G 21/00

[52] U.S. Cl. ............................ 156/71; 156/227; 156/248; 156/249; 156/250; 156/256; 156/267; 156/289; 33/563; 33/DIG. 20; 52/747.11

[58] Field of Search .............................. 156/71, 227, 247, 156/248, 249, 250, 256, 267, 289; 33/1 B, 563, DIG. 20; 52/747.11, 749.11

[56] References Cited

U.S. PATENT DOCUMENTS

| | | | |
|---|---|---|---|
| 4,114,346 | 9/1978 | Kelly | 52/746 |
| 4,212,110 | 7/1980 | Hill, Jr. . | |
| 4,345,381 | 8/1982 | Brislin . | |
| 4,353,759 | 10/1982 | Stallings | 156/267 X |
| 4,372,050 | 2/1983 | Eisenhauer . | |
| 4,659,409 | 4/1987 | Arafat | 156/249 |
| 4,712,309 | 12/1987 | Kingston et al. | 33/DIG. 20 X |
| 4,730,398 | 3/1988 | Stanton | 33/1 |
| 4,827,625 | 5/1989 | Le Moal | 33/DIG. 20 X |
| 5,076,612 | 12/1991 | Nirmel | 283/67 |
| 5,195,249 | 3/1993 | Jackson | 33/528 |
| 5,347,724 | 9/1994 | Hankins | 33/563 |
| 5,471,758 | 12/1995 | White, Sr. | 33/DIG. 527 |
| 5,491,902 | 2/1996 | Uhrin et al. | 33/563 |
| 5,557,996 | 9/1996 | Reber et al. | 83/56 |
| 5,673,489 | 10/1997 | Robell . | |
| 5,768,793 | 6/1998 | Fields | 52/749.11 X |
| 5,829,150 | 11/1998 | McEligot | 33/563 X |

OTHER PUBLICATIONS

"Introducing Perfect Angle PRO" advertisement, VersaTool Development Company ©1996, 2 pages.

"Perfect Angle PRO™" advertisement, VersaTool Development Company ©1996, 4 pages.

*Primary Examiner*—Curtis Mayes

*Attorney, Agent, or Firm*—Cahill, Sutton & Thomas, P.L.C.

[57] ABSTRACT

An apparatus and method for installing tile or other rigid floor or wall coverings around obstacles in irregularly shaped areas includes a foldable sheet of durable paper. The lower face of the foldable sheet includes a non-absorbent sealing layer of wax, plastic, or the like for allowing the foldable sheet to be placed against wet mastic adhesive without damaging the foldable sheet. The upper face of the foldable sheet is marked with a reference grid. The foldable sheet is formed to be of the same dimensions as a whole piece of tile. The foldable sheet is placed in the position where a tile is to be installed and folded away from obstacles which the tile must ultimately pass around. The fold lines are then marked to indicate the portions of a tile that must be cut away before such tile can be installed in such irregular space. A residue of wet mastic adhesive helps secure the template over the face of the tile to be cut. The template then serves as a guide for cutting the underlying tile.

6 Claims, 2 Drawing Sheets

METHOD FOR CUTTING RIGID TILE

BACKGROUND OF THE INVENTION

1. Field of the Invention

The present invention relates generally to the installation of tile or other rigid elements of the type generally secured by an adhesive, and more particularly, to a template used to simplify the cutting of tiles to be installed in irregular spaces.

2. Description of the Related Art

Ceramic tile is a widely-used and highly-desired covering for floors, walls, countertops, and other surfaces. Ceramic tile is highly durable, easily cleaned, and attractive. Ceramic tile is available in a number of standardized sizes and shapes. Installation typically requires application of a wet mastic adhesive to the floor or wall to which such tile is to be secured.

When laying ceramic tile, one typically begins laying tile from the center of a room, placing additional tiles in adjacent rows and columns, and working one's way outwardly toward the outer perimeter of the room. These central whole pieces of tile are typically referred to as the "field tile". However, one typically finds that, at the outer perimeter of the area being tiled, less than a whole tile is required to fill the available space. In addition, at corners of a room, or in areas where, for example, a baseboard juts into the tile space, whole tiles must be cut to fit within the available space. Tile cutting is typically accomplished by a so-called "wet saw", a circular saw which is continuously wetted to keep the saw blade from overheating. Cutting ceramic tile is tedious; nonetheless, tile cutting has been typically performed in the past by trial and error methods. If one cuts away too little material, the tile must be brought back to the saw, and the whole cutting procedure must be repeated. On the other hand, if one cuts too much material away, then the cut tile must be discarded, and one must start again with a fresh tile. Thus, this trial and error method often proves to be time-consuming and wasteful.

Others have attempted to provide tools for marking tiles to be placed within irregular spaces. For example, U.S. Pat. No. 5,471,758 (White) discloses a tile measuring device for marking a tile prior to cutting. However, the disclosed device, commercially marketed by VersaTool Development Company of Tempe, Arizona under the brand name "Perfect Angle Pro", is expensive and relatively difficult to use. In addition, such tool would appear to be limited to square tiles, whereas ceramic tiles are available in a wide variety of shapes.

Accordingly, it is an object of the present invention to provide an apparatus and method for simplifying the task of cutting rigid tiles to fit within irregular spaces.

Another object of the present invention is to increase the accuracy of wet or dry cutting of rigid tiles and the like.

Yet another object of the present invention is to provide an apparatus and method for facilitating the cutting of tiles without imposing any significant additional expense to a user.

Still another object of the present invention is to provide such an apparatus and method which quickly and accurately indicates the portions of a whole tile that need to be cut away in order for the tile to fit within an irregular space.

A further object of the present invention is to provide such an apparatus which is simple and inexpensive to manufacture.

A still further object of the present invention is to provide such an apparatus and method which can be adapted to tiles of any shape.

These and other objects of the present invention will become more apparent to those skilled in the art as the description thereof proceeds.

SUMMARY OF THE INVENTION

Briefly described, and in accordance with a preferred embodiment thereof, the present invention relates to a template that aids in the installation of tiles, and more particularly, in the cutting of tiles to properly fit within an irregular space. The template includes a sheet of foldable material, such as durable paper, having a lower face and an opposing upper face. This sheet of foldable material will ultimately be of the same dimensions as the tiles being installed. If the sheet of foldable material is initially of larger dimensions than the tiles being installed, it can be trimmed to be the same dimensions as the tiles being installed. The sheet of foldable material is preferably rectangular. Since most tiles are shaped as a square, the sheet of foldable material may also be shaped as a square. However, the sheet of foldable material may also be formed as a non-rectangular shape, if desired, to match the shape of non-rectangular tiles.

The upper face of the sheet of foldable material has reference indicia printed thereon. These reference indicia are preferably in the form of intersecting grid lines that form a reference grid and assist a user in drawing straight marking lines upon the upper face of the sheet during usage of such template.

The lower face of the sheet of foldable material has a non-absorbent sealing layer of material applied thereto. This sealing layer may be formed, for example, by a wax coating or plastic coating bonded to the lower face of the foldable material. This sealing layer allows the sheet of foldable material to be applied firmly against wet mastic adhesive, and to be folded against any surrounding obstacles, without causing damage to, or deformation of, the sheet of foldable material. As the sealing layer applied to the lower face of the sheet of foldable material is pressed against the underlying wet mastic adhesive, a small quantity of the wet mastic adhesive is retained by such sealing layer; this quantity of adhesive can later be used to secure the template over a piece of tile to be cut.

During use of the template, the sheet of foldable material is positioned over the mastic adhesive in the location where a tile is to be installed. Portions of the sheet of foldable material that interfere with obstacles, such as baseboards, fixtures, etc., can be folded over, creased, and marked to designate portions of the tile that need to be cut away. The resulting template is thereafter secured to the face of a tile to indicate portions of the tile that must be cut away.

If desired, a large number of such templates can be commonly, and releasably, bound along one edge thereof to a binder to form a tablet from which such templates can be conveniently removed by tearing them away from the binder when needed.

The method of for installing pieces of tile into irregular spaces, in accordance with the present invention, includes the step of providing a sheet of such foldable material having substantially the same dimensions as the predetermined dimensions of the pieces of tile that are being installed. The foldable sheet of material is positioned against the wet mastic adhesive in the location at which a piece of tile is to be installed. The user then folds the foldable sheet of material around any obstacles or other boundaries that define the irregular space to form one or more fold lines upon the foldable sheet. The user then marks the portions of the fold lines that border along portions of the tile that need to be cut away; this marking procedure can include the step of drawing lines along the fold lines with a marking pen or other writing instrument. Alternatively, the user can "mark" such fold lines by taking a razor, utility knife, or the like, and directly cutting along such fold lines without first drawing an inked line along the fold line. If the fold lines are marked with a pen or pencil, the user can use a razor or utility knife to cut along such marked lines.

When the sheet of foldable material is removed from the location at which such tile is to be installed, a small residue of adhesive remains secured to the lower face of the foldable sheet. The user then positions the lower face of the foldable sheet of material over the face of the tile to be cut, while allowing adhesive residue retained by the lower face of the foldable sheet to temporarily secure the foldable sheet to the face of the tile to be cut. The foldable sheet now serves as a template for indicating the areas of the tile to be cut.

If desired, the foldable sheet of material can be left on the face of the tile during the cutting procedure to indicate the areas of the tile to be cut. Alternatively, the outline of the template can be traced upon the face of the tile using a wax pencil or the like, in which case the template can then be removed. In either case, the tile is then cut using the pattern provided by the template. The cut tile is then installed within the irregular space.

DETAILED DESCRIPTION OF THE PREFERRED EMBODIMENTS

Figure 1:
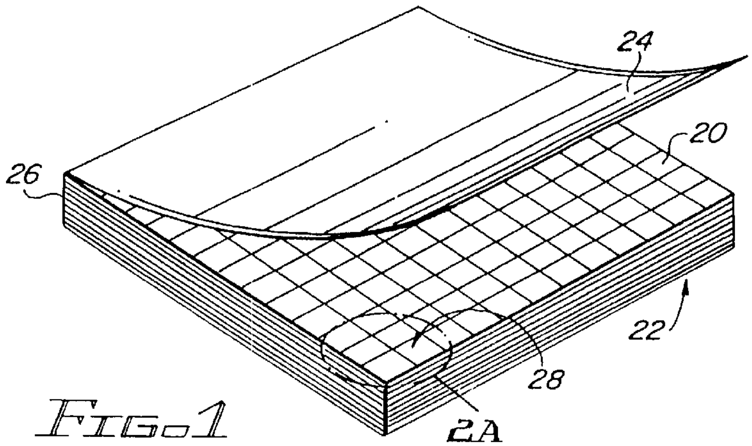
FIG. 1 is a perspective view of a tablet containing multiple units of a tile template made in accordance with a preferred embodiment of the present invention.

A series of templates constructed in accordance with the present invention is shown in FIG. 1; the uppermost template is designated by reference numeral 20 within FIG. 1. Template 20 is designed to aid in the installation and cutting of rigid tiles that are being installed on a floor, wall, countertop or the like. While the word "tile" as used herein includes ceramic tile, it is intended to include as well other decorative rigid coverings of the type that are secured to a floor or wall in a patterned array, including for example, marble, stone, wood parquet squares, etc. In particular, template 20 can be advantageously used in those instances when a piece of such tile must be cut to properly fit within an irregular space. Template 20 is shown in FIG. 1 as being rectangular, and may be square, i.e., its length and width may be equal to each other. The length and width of template 20 are either substantially the same as, or greater than, the corresponding dimensions of the tiles to be installed. If desired, template 20 may be formed in non-rectangular shapes; for example, template 20 may be provided in an octagonal shape so that template 20 need not be further trimmed to lay octagonal tiles.

The series of such templates shown in FIG. 1 forms a stack designated generally by reference numeral 22 protected by a cover sheet 24. If desired, the cover sheet may contain advertising material and/or logos of the manufacturer and/or distributor. Template 20 and each of the other templates included in stack 22 of FIG. 1 each includes an upper edge releasably secured to a binder 26 from which such templates can be torn away for use, in much the same way that sheets of writing paper are commonly bound into a pad or tablet.

Figure 2A:
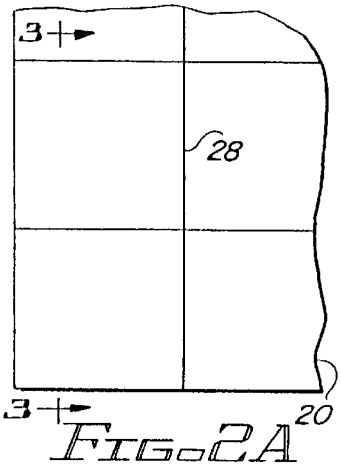
FIGS. 2A, 2B, and 2C are each enlarged partial top views of the tile templates shown in FIG. 1 illustrating the manner in which the printed grid size may be varied.
Figure 2B:
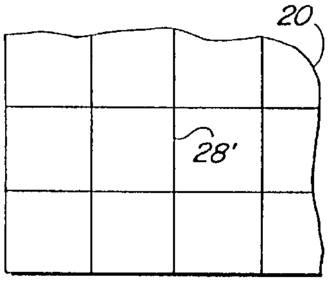
Figure 2C:
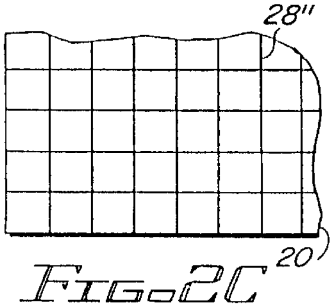

As indicated in FIG. 1, template 20 has reference indicia visible upon the upper face of such template. As indicated in FIG. 2A, this reference indicia is preferably in the form of intersecting grid lines for forming a reference grid 28. FIGS. 2B and 2C simply show alternate embodiments of such reference grid 28' and 28" with progressively increasing numbers of grid lines per inch.

Figure 3:
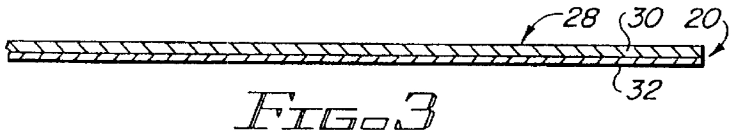
FIG. 3 is an enlarged cross-sectional view, taken through the plane indicated by lines 3—3 in FIG. 2A, and depicting the upper paper layer and the lower wax-like layer secured thereto.

Within the cross-sectional drawing of FIG. 3, template 20 can be seen to include a sheet of foldable material 30 having opposing upper and lower faces; sheet 30 is preferably formed by a sheet of durable paper, such as the grade and stock of paper commonly used to package frozen food products. As indicated in FIG. 3, the reference grid 28 is printed upon the upper face of paper sheet 30. Secured to the lower face of paper sheet 30 is a non-absorbent sealing layer of material 32. Sealing layer 32 may be formed by a wax coating or a plastic coating. Sealing layer 32 strengthens paper sheet 30 and helps to prevent paper sheet 30 from stretching, ripping or deforming during use.

Those skilled in the art know that wet mastic adhesive is often used to set tile in place; such mastic adhesive is typically troweled over the area of the floor or wall where tiles are presently being laid. Sealing layer 32 protects paper sheet 30 and allows template 20 to be applied firmly against such wet mastic adhesive, and to be folded against any surrounding obstacles, without causing damage to, or deformation of, paper sheet 30. While sealing layer 32 is non-absorbent, it nonetheless retains a small quantity, or thin coating, of mastic adhesive when template 20 is pulled therefrom. As will be described in greater detail below, this feature of sealing layer 32 is very useful for securing template 20 over a piece of tile to be cut. Yet, sealing layer 32 prevents such mastic adhesive from permanently adhering to paper sheet 30.

The manner of using template 20 will now be described in conjunction with the flow diagram of FIG. 4 and the sequential drawings of FIGS. 5A through 5H. Incidentally, the following description also sets forth a preferred embodiment of the method of installing tiles in irregular spaces, in accordance with the present invention.

First, template 20 may be provided in numerous different sizes, including the dimensions of many common ceramic tiles. On the other hand, template 20 can be sold in large standardized sheets (e.g., 17 inches×17 inches), with the understanding that the user will first cut such sheets down to the dimensions of the tiles being installed. If template 20 already happens to be of the same dimensions and shape as the tile being installed, then no preliminary trimming is required. If, however, template 20 is initially larger than the actual size of the tiles that are being installed, or differs in shape from such tiles, then the first step is to cut template 20 down to the dimensions of the actual tiles being installed, as indicated by block 34 of FIG. 4, so that template 20 has substantially the same length and width dimensions, and shape, as the pieces of tile being installed.

Figure 4:
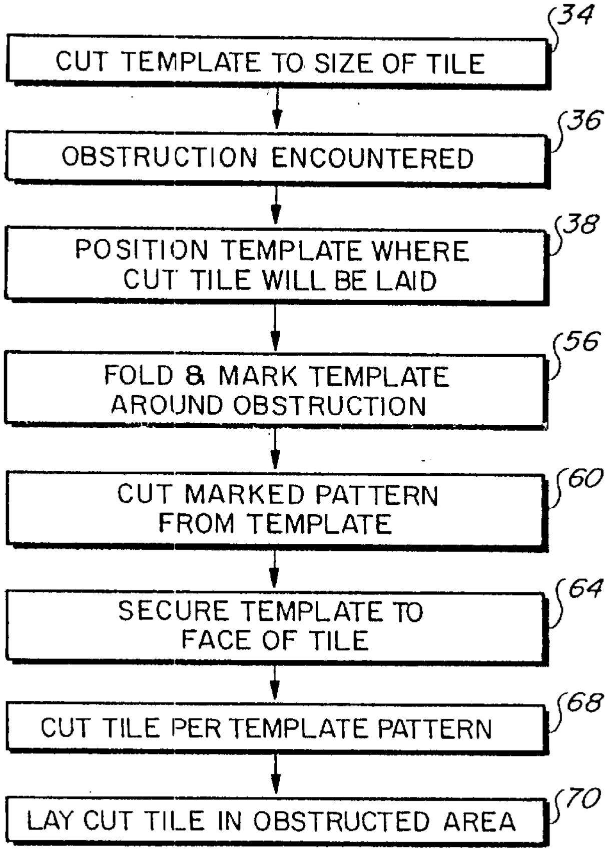
FIG. 4 is a flow diagram illustrating the steps performed by a user in practicing a method of cutting floor tile to be installed around obstructions in accordance with a further embodiment of the present invention.
Figure 5A:
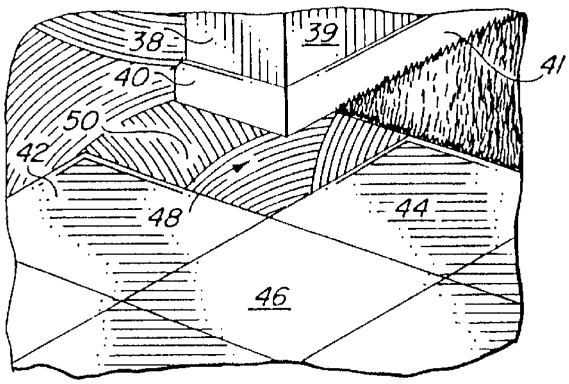
FIG. 5A is a perspective view of an irregularly shaped area of a floor to be tiled, wherein a wall footing requires that a portion of a full tile be removed to fit neatly thereagainst.

Next, assume that an obstruction is encountered along the outer periphery of the field tiles, as indicated by block 36 in FIG. 4 and by FIG. 5A. Such obstruction might be the end of a wall 38 and its associated baseboard 40 shown in FIG. 5A. Whole tiles 42, 44 and 46 have already been laid on the floor, but the tile to be installed in irregular space 48 adjacent tiles 42 and 44 tile must be cut to properly fit around wall 38 and baseboard 40. As indicated in FIG. 5A, wet mastic adhesive 50 already covers the floor in the vicinity of irregular space 48.

In this event, template 20, which has already been cut to the size of tiles 42–46, is positioned against the adhesive 50 in the location at which a piece of tile is to be installed within irregular space 48. This step is represented in FIG. 4 by box 38 and is illustrated in FIG. 5A. Note that template 20 is spaced from the edges of tiles 42 and 44 by the same distance that an actual tile would be spaced therefrom in order to ultimately form a grout line.

Figure 5E:
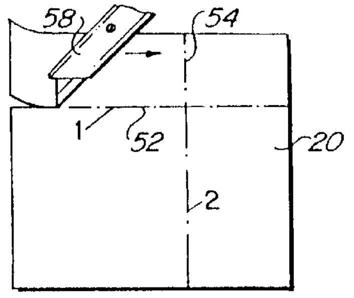
FIG. 5E illustrates the trimming of the template of FIGS. 5B–5D to leave a template having the dimensions of the desired tile section.
Figure 5F:
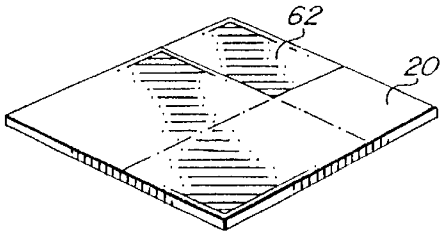
FIG. 5F illustrates the alignment of the template of FIG. 5E upon a full tile section to be cut to the desired size.
Figure 5B:
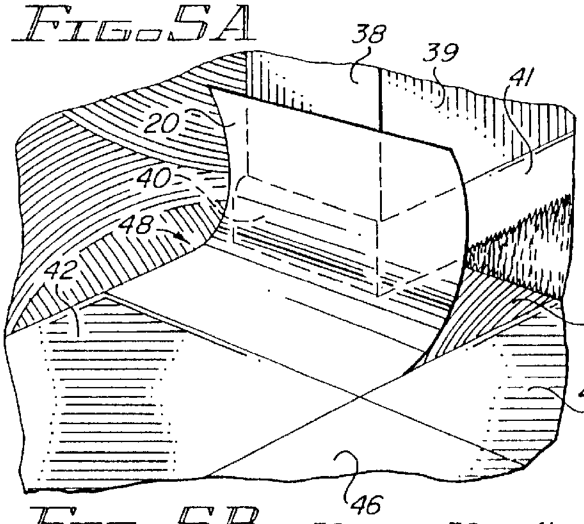
FIG. 5B illustrates the manner in which a tile template of the type shown in FIG. 1 is placed over the floor area shown in FIG. 5A.
Figure 5G:
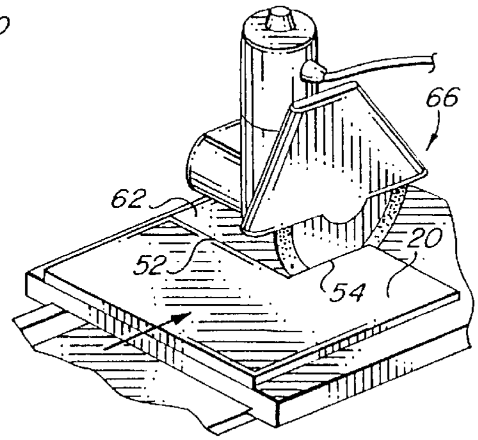
FIG. 5G depicts the cutting of the floor tile shown in FIG. 5F, with the tile template secured thereto as a cutting guide.
Figure 5C:
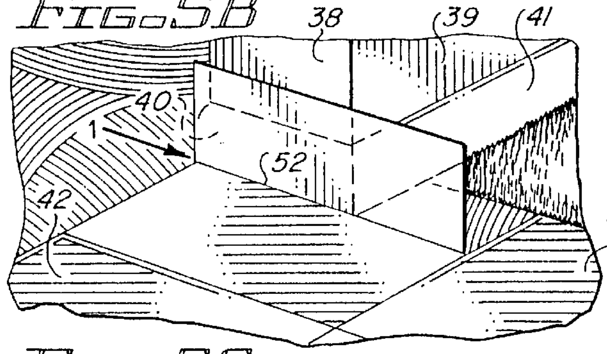
FIG. 5C illustrates the template of FIG. 5B after being folded a first time to mark a first cut line.
Figure 5D:
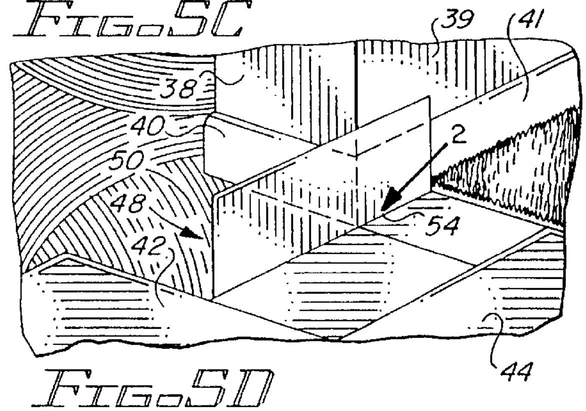
FIG. 5D illustrates the template of FIGS. 5B and 5C after being folded a second time to mark a second cut line.

As shown in FIG. 5C, template 20 is pushed upwardly along baseboard 30 and the end of the wall 38, and a first fold line, or crease line 52, is formed where template 20 intercepts the bottom of baseboard 40. Turning to FIG. 5D, a portion of template 20 is raised off of wet mastic adhesive 50, and template 20 is folded up along sidewall 39; a second fold line, or crease line 54, is formed where template 20 intercepts baseboard 41 below sidewall 39. The steps shown in FIGS. 5C and 5D are incorporated within block 56 of FIG. 4.

Preferably, template 20 bearing crease lines 52 and 54 is now removed from irregular space 48 and placed on a cutting table. In order to highlight the crease lines 52 and 54, the user can draw along such lines with a marking pen or pencil, indicating those portions of the original fold lines that border along portions of the tile that need to be cut away, i.e., the cut lines along which the tile needs to be cut. In this regard, the reference grid lines assist the user in drawing such markings upon template 20.

In the preferred embodiment of the present invention, a razor or utility knife 58 is then guided along the marked portions of crease lines 52 and 54, as indicated in FIG. 5E. Knife 58 is used to cut away the portion of irregular space 48 that is occupied by the obstruction, thereby leaving template 20 as a completed template having the exact dimensions of the tile to be laid in irregular space 48. This step is represented in FIG. 4 by block 60.

As mentioned above, when template 20 is lifted from the wet mastic adhesive 50 that covers irregular space 48, a small residue of adhesive remains secured to the lower face/sealing layer 32 of template 20. A fresh tile to be cut, designated by reference numeral 62 in the drawings, is then selected, and completed template 20, with its still tacky sealing layer 32 facing downward, is positioned over the upper face of tile 62, in the manner shown in FIG. 5F. The adhesive residue retained by sealing layer 32 of template 20 temporarily secures template 20 to tile 62. Template 20 now serves to indicate the areas of tile 62 that need to be cut away. This step is indicated by block 64 in FIG. 4.

At this point, one can proceed in two different ways. First, the user can leave template 20 secured to the upper face of tile 62 and cut tile 62 along the trimmed edges of template 20. As indicated in FIG. 5G, tile 62, with template 20 secured thereto, is advanced into the circular cutting blade of wet saw 66 while maintaining the blade along crease line 54 of template 20; upon reaching crease line 52, tile 62 is withdrawn from wet saw 66. Tile 62 is then rotated 90 degrees, and tile 62 is advanced into the circular cutting blade of wet saw 66 along crease line 52 until reaching crease line 54. At this point, tile 62 has been cut to its final configuration, and template 20 is removed from tile 62. These steps are collectively represented by block 68 in FIG. 4.

Alternatively, once template 20 is secured over the upper face of tile 62, one may then easily trace the pattern indicated by template 20 onto the upper face of tile 62, as by using a wax marking pencil. After tracing the pattern onto tile 62, template 20 is removed from tile 62, and the cutting steps mentioned in the preceding paragraph are performed with the aid of the traced pattern rather than with template 20 itself. Block 68 of FIG. 4 may likewise represent this trace-and-cut procedure.

Figure 5H:
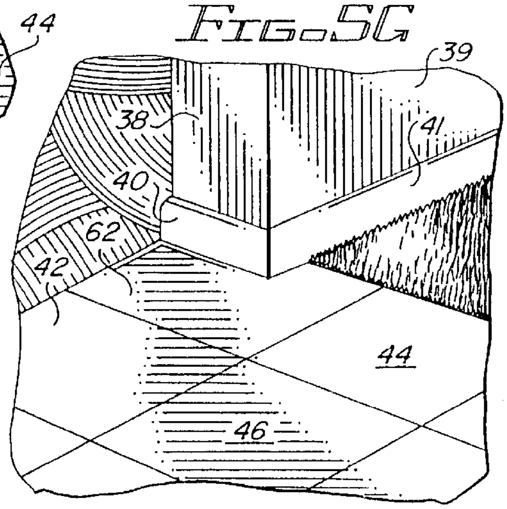
FIG. 5H illustrates the laying of the tile cut in FIG. 5F into the irregularly shaped floor space shown in FIG. 5A.

Of course, the last step in the procedure is to install cut tile 62, with the desired pattern already formed therein, within irregular space 48, as shown in FIG. 5H. This step is represented in FIG. 4 by final block 70.

Those skilled in the art will now appreciate that an apparatus and method have been described which greatly simplify the cutting of rigid tiles and like materials for installation in irregularly shaped spaces. The use of the disclosed apparatus and method insures a more precise cut for allowing the cut tile to fit properly within the irregular space. The disclosed apparatus and method eliminate the need to use the conventional sight trial and error and method, saving installation time and material costs. In addition, the cutting accuracy provided by the present invention adds to the aesthetic appearance of the overall finished project. Moreover, the disclosed template can be manufactured easily and inexpensively; it can be sold for a price that does not significantly impact the user's cost of a tile installation project, and such template is easy to use. Furthermore, it can be used when installing tiles of almost any shape.

While the present invention has been described with respect to preferred embodiments thereof, such description is for illustrative purposes only, and is not to be construed as limiting the scope of the invention. Various modifications and changes may be made to the described embodiments by those skilled in the art without departing from the true spirit and scope of the invention as defined by the appended claims.

I claim:

1. A method for installing pieces of tile of the type that are secured to a floor or wall by an adhesive, in those instances when a piece of such tile must be cut to properly fit within an irregular space, each such piece of tile having predetermined dimensions, said method comprising the steps of:

a. providing a sheet of foldable material having a lower face and an opposing upper face, said sheet of foldable material being formed to have substantially the same dimensions as the predetermined dimensions of the pieces of tile that are being installed, the upper face of the sheet of foldable material having a reference grid printed thereon, and the lower face of said foldable material including a non-absorbent sealing layer for allowing said sheet of foldable material to be applied firmly against the adhesive without causing damage to, or deformation of, the sheet of foldable material;

b. positioning the foldable sheet of material against the adhesive in the location at which a piece of tile is to be installed;

c. folding the foldable sheet of material around any obstacles or other boundaries that define the irregular space to form one or more fold lines upon the foldable sheet;

d. marking the portions of the fold lines that border along portions of the tile that need to be cut away;

e. removing the foldable sheet of material from the location at which such tile is to be installed, while allowing a small residue of adhesive to remain secured to the lower face of the foldable sheet;

f. positioning the lower face of the foldable sheet of material over a face of a tile to be cut, while allowing adhesive residue retained by the lower face of the foldable sheet to temporarily secure the foldable sheet to the tile to be cut, for allowing the foldable sheet to act as a template for indicating the areas of the tile to be cut.

2. The method recited by claim 1 including the further steps of a. cutting the tile while using the markings formed upon the foldable sheet to indicate the portions of the tile to be cut; and b. installing the cut tile within the irregular space.

3. The method recited by claim 1 including the further steps of:

a. tracing the pattern indicated on the template onto the upper face of the tile;

b. removing the template from the tile;

c. cutting the tile while using the traced pattern formed upon the tile to indicate the portions of the tile to be cut; and d. installing the cut tile within the irregular space.

4. The method recited by claim 1 wherein said step of forming the sheet of foldable material to have substantially the same dimensions as the predetermined dimensions of the pieces of tile that are being installed includes the steps of initially providing such foldable sheet of material as having dimensions that exceed the corresponding predetermined dimensions of the tiles to be installed, and thereafter trimming such foldable sheet to have dimensions substantially the same as the predetermined dimensions of the tiles to be installed.

5. The method recited by claim 1 wherein the step of marking the portions of the fold lines that border along portions of the tile that need to be cut away includes the step of drawing lines along said fold lines with a writing instrument.

6. The method recited by claim 1 wherein the step of marking the portions of the fold lines that border along portions of the tile that need to be cut away includes the step of cutting the foldable sheet of material along said fold lines with a cutting tool.

* * * * *